United States Patent
Fukuma et al.

(10) Patent No.: US 9,791,045 B2
(45) Date of Patent: Oct. 17, 2017

(54) OIL RING

(71) Applicant: Mazda Motor Corporation, Aki-gun, Hiroshima (JP)

(72) Inventors: Masaki Fukuma, Hiroshima (JP); Hiroaki Muranaka, Higashihiroshima (JP); Shuma Aoki, Aki-gun (JP); Shuji Takuma, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 14/825,702

(22) Filed: Aug. 13, 2015

(65) Prior Publication Data

US 2016/0076649 A1  Mar. 17, 2016

(30) Foreign Application Priority Data

Sep. 12, 2014 (JP) .................................. 2014-186424

(51) Int. Cl.
*F16J 9/10* (2006.01)
*F16J 9/06* (2006.01)
*F16J 9/20* (2006.01)

(52) U.S. Cl.
CPC ................. *F16J 9/10* (2013.01); *F16J 9/064* (2013.01); *F16J 9/206* (2013.01)

(58) Field of Classification Search
CPC ................. F16J 9/064; F16J 9/203; F16J 9/10
See application file for complete search history.

(56) References Cited

U.S. PATENT DOCUMENTS

| | | | |
|---|---|---|---|
| 7,306,232 B2 | 12/2007 | Fiedler | |
| 7,354,045 B2 | 4/2008 | Abe et al. | |
| 2010/0090416 A1* | 4/2010 | Tomanik | F16J 9/14 277/499 |
| 2010/0176557 A1* | 7/2010 | Peter-Klaus | F16J 9/20 277/460 |
| 2012/0261886 A1* | 10/2012 | Chiba | F16J 9/206 277/443 |

(Continued)

FOREIGN PATENT DOCUMENTS

| | | | |
|---|---|---|---|
| FR | 2723401 | * | 2/1996 |
| JP | 2002323133 A | * | 11/2002 |

(Continued)

*Primary Examiner* — L. Susmitha Koneru
(74) *Attorney, Agent, or Firm* — Alleman Hall Creasman & Tuttle LLP

(57) ABSTRACT

An oil ring to be attached to a ring groove of a piston for an engine is provided. The oil ring includes two annular ring bodies having a common axis and arranged in tandem, and an expander for biasing the ring bodies radially outward. A sliding surface is formed at an outer circumference of each ring body to bulge radially outward and slides on a cylinder inner circumferential surface. The sliding surface of one of the ring bodies has a tip portion and first and second curved surfaces. In cross sections of the first and second curved surfaces, the first and second curved surfaces are connected while tangent lines to the cross sections at the tip portion align with each other, and when positional change rates are compared between points on the first and second curved surfaces, a change rate of the first curved surface is lower.

20 Claims, 9 Drawing Sheets

(56) References Cited

U.S. PATENT DOCUMENTS

| | | | |
|---|---|---|---|
| 2013/0154196 A1* | 6/2013 | Sytsma | B23P 15/06 277/434 |
| 2013/0181410 A1* | 7/2013 | Chiba | F16J 9/062 277/443 |
| 2013/0181411 A1* | 7/2013 | Esser | F16J 9/26 277/443 |
| 2013/0187340 A1* | 7/2013 | Esser | F16J 9/26 277/442 |
| 2014/0008874 A1* | 1/2014 | Esser | C23C 8/04 277/443 |
| 2014/0165826 A1* | 6/2014 | Baerenreuter | F16J 9/062 92/172 |
| 2015/0130143 A1* | 5/2015 | Meyer | F16J 9/206 277/442 |
| 2015/0184748 A1* | 7/2015 | Sytsma | F16J 9/064 277/310 |
| 2015/0267813 A1* | 9/2015 | Williams | B23P 15/08 123/193.6 |
| 2016/0069456 A1* | 3/2016 | Mahl | F16J 9/20 277/434 |

FOREIGN PATENT DOCUMENTS

| | | |
|---|---|---|
| JP | 2007504416 A | 3/2007 |
| JP | 2014040914 A | 3/2014 |
| NO | 2004040174 A1 | 5/2004 |

\* cited by examiner

OIL RING

BACKGROUND

The present invention relates to an oil ring.

Conventionally, oil rings attached to pistons of engines are known. For example, JP2007-504416A discloses an oil ring including an expansion spring (expander) and a pair of annular disks (side rails). An outer circumferential surface of each disk is formed to bulge outward in radial directions of the disk. The outer circumferential surface slides on a cylinder inner circumferential surface with an oil film intervening therebetween. A tip portion (portion protruding the most radially outward) of the outer circumferential surface is offset from the center of the disk in its thickness direction (i.e., axial direction). In other words, the outer circumferential surface has a shape which is asymmetric with respect to a plane passing through the center of the disk in the thickness direction perpendicular to the thickness direction.

Incidentally, the outer circumferential surface of each disk of JP2007-504416A is formed by two different curved surfaces on the combustion chamber side and the crank chamber side with respect to the tip portion. Specifically, when the outer circumferential surface is cut in a plane perpendicular to a circumferential direction of the disk, the cross section of the curved surface on the combustion chamber side and the cross section of the curved surface on the crank chamber side are formed by two different quadratic curves. Further, the curved surfaces are coupled to each other at the tip portion, and the connecting portion, i.e., a tip portion, has an edge shape, i.e., is edged.

If the tip portion is edged, the pressure on the tip portion becomes excessively high, and the tip portion may be abraded. Especially when the sliding speed of the outer circumferential surface is zero, such as when the piston is at the top dead center or the bottom dead center, the tip portion may contact with the cylinder inner circumferential surface, which causes abrasion of the cylinder inner circumferential surface as well. If the tip portion or the cylinder inner circumferential surface is abraded, the oil consumption increases. Moreover, if the oil film is extremely thin or any part of the disk contacts with the cylinder inner circumferential surface, the sliding resistance may increase.

Further, near the tip portion of the outer circumferential surface of each disk of JP2007-504416A, the curved surface on the combustion chamber side has a larger inclination than that of the curved surface on the crank chamber side with respect to the cylinder inner circumferential surface. In general, oil rings are required to have a function to form an oil film with suitable thickness when the piston moves to the combustion chamber side, while scraping off unnecessary oil when the piston moves to the crank chamber side. However, in the disk of JP2007-504416A, the curved surface on the combustion chamber side near the tip portion has the larger inclination with respect to the cylinder inner circumferential surface, and thus, the oil film with the suitable thickness cannot be formed and the sliding resistance may increase.

SUMMARY

The present invention is made in view of the above situations and aims to reduce the sliding resistance of an oil ring by forming a suitable oil film, and to reduce oil consumption.

According to an aspect of the present invention, an oil ring to be attached to a ring groove of a piston for an engine is provided. The oil ring includes two annular ring bodies having a common axis and arranged in tandem, and an expander for biasing the ring bodies radially outward. A sliding surface is formed at an outer circumference of each of the ring bodies to bulge radially outward and slides on an inner circumferential surface of a cylinder. The sliding surface of at least one of the ring bodies located on a combustion chamber side of the engine has a tip portion where the ring body has a largest diameter, a first curved surface on the combustion chamber side with respect to the tip portion, and a second curved surface on the opposite side from the combustion chamber with respect to the tip portion. In cross sections of the first and second curved surfaces taken along a plane perpendicular to a circumferential direction of the ring body, the first and second curved surfaces are connected with each other while tangent lines to the cross sections at the tip portion align with each other. In the cross sections of the first and second curved surfaces, when a positional change rate of a point on the first curved surface is compared with a positional change rate of a point on the second curved surface, the change rate of the first curved surface is lower than the change rate of the second curved surface, the positional change rate indicating the positional change to the radially inward side with respect to a distance from the tip portion in the axial direction of the ring body, the point on the first curved surface and the point on the second curved surface being taken at the same distance from the tip portion in the axial direction.

With the above configuration, the first and second curved surfaces are connected to each other while the tangent lines to the cross sections at the tip portion align with each other. Specifically, the tip portion where the first and second curved surfaces are connected to each other is formed to curve without an edge. Thus, a pressure on the tip portion is reduced and abrasion of the tip portion is suppressed.

Additionally, when the points are taken on the first curved surface and the second curved surface at the same distance from the tip portion in the axial direction and the positional change rate of the point on the first curved surface is compared with the positional change rate of the point on the second curved surface, the change rate of the first curved surface is lower than the change rate of the second curved surface. In other words, since the positional change rate to the radially inward side with respect to the distance from the tip portion in the axial direction of the ring body changes according to the positions on the curved surfaces due to the curved shape of the first and second curved surfaces, when the change rate of the first curved surface is compared with that of the second curved surface at the points taken at the same distance from the tip portion in the axial direction, the change rate of the first curved surface is lower than that of the second curved surface. Specifically, the inclination of the first curved surface with respect to the inner circumferential surface of the cylinder is smaller than that of the second curved surface. When the piston moves to the combustion chamber side, the first curved surface is located on the forward side of the moving direction and greatly contributes to forming an oil film. By designing the first curved surface to have a small inclination with respect to the inner circumferential surface of the cylinder, when the piston moves to the combustion chamber side, the wedge effect is easily produced between the sliding surface and the inner circumferential surface of the cylinder, which allows the formation of an oil film with suitable thickness and reduces a an amount of oil scraped up to the combustion chamber. Thus, sliding resistance and oil consumption can be reduced.

On the other hand, when the piston moves to the opposite side from the combustion chamber, the second curved surface is located on the forward side of the moving direction and greatly contributes in scraping off the oil. When the change rate of the first curved surface is compared with the change rate of the second curved surface, the change rate of the second curved surface is larger than that of the first curved surface. Specifically, the inclination of the second curved surface with respect to the inner circumferential surface of the cylinder is larger than that of the first curved surface. Therefore, the wedge effect of the second curved surface is lower than that of the first curved surface, and the effect of the second curved surface to scrape off the oil becomes rather high. Thus, when the piston moves to the opposite side from the combustion chamber, the oil can effectively be scraped off and the oil consumption can be reduced.

Since the amount of oil scraped up to the combustion chamber can be reduced and the oil can effectively be scraped off to the opposite side from the combustion chamber by devising the shapes of the sliding surfaces, a tension of the oil ring caused radially outward can also accordingly be reduced. If the tension of the oil ring can be reduced, the sliding resistance of the piston can also be reduced.

According to another aspect of the present invention, an oil ring to be attached to a ring groove of a piston for an engine is provided. The oil ring includes an annular ring body, and an expander for biasing the ring body radially outward. Two annular slide parts having a common axis and arranged in tandem are provided at an outer circumference of the ring body. A sliding surface is formed at each of the slide parts to bulge radially outward and slides on an inner circumferential surface of a cylinder. The sliding surface of at least one of the slide parts located on a combustion chamber side of the engine has a tip portion where the slide part has a largest diameter, a first curved surface on the combustion chamber side with respect to the tip portion, and a second curved surface on the opposite side from the combustion chamber with respect to the tip portion. In cross sections of the first and second curved surfaces taken along a plane perpendicular to a circumferential direction of the slide part, the first and second curved surfaces are connected with each other while tangent lines to the cross sections at the tip portion align with each other. In the cross sections of the first and second curved surfaces, when a positional change rate of a point on the first curved surface is compared with a positional change rate of a point on the second curved surface, the change rate of the first curved surface is lower than the change rate of the second curved surface, the positional change rate indicating the positional change to the radially inward side with respect to a distance from the tip portion in the axial direction of the slide part, the point on the first curved surface and the point on the second curved surface being taken at the same distance from the tip portion in the axial direction.

The above configuration is different from the oil ring of the above aspect in that two annular sliding parts are provided to the ring body. Note that the configuration of the sliding surface of at least one of the slide parts located on the combustion chamber side is similar to the configuration of the sliding surface of at least one of the ring bodies of the oil ring located on the combustion chamber side according to the above aspect.

In other words, since the tip portion which is the connecting portion of the first and second curved surfaces is formed to curve, the pressure on the tip portion is reduced and abrasion of the tip portion is suppressed. Additionally, when the points are taken on the first curved surface and the second curved surface at the same distance from the tip portion in the axial direction and the positional change rate of the point on the first curved surface is compared with the positional change rate of the point on the second curved surface, the change rate of the first curved surface is lower than the change rate of the second curved surface. Therefore, when the piston moves to the combustion chamber side, the oil film with suitable thickness can be formed while reducing the amount of oil scraped up to the combustion chamber, and the sliding resistance can be reduced, whereas when the piston moves to the opposite side from the combustion chamber, the oil can effectively be scraped off.

When the ring body is inclined the most within the ring groove while the piston moves to the combustion chamber side, an end part of the first curved surface may form a wedge-shaped gap with the inner circumferential surface of the cylinder without contacting with the inner circumferential surface of the cylinder, the end part being on the opposite side from the tip portion.

When the piston moves, the ring body may tilt due to clearance formed within the ring groove. When the piston moves to the combustion chamber side, the ring body is inclined to the opposite side from the combustion chamber as it extends radially outward, due to the friction with the inner circumferential surface of the cylinder. Therefore, the portion of the ring body which contacts (indirectly contacts via the oil film, to be precise) with the inner circumferential surface of the cylinder is not located at the tip portion, but at the first curved surface. Here, if the first curved surface is narrow, the ring body slides on the inner circumferential surface of the cylinder at a ridge portion formed between the first curved surface and a side surface of the ring body on the combustion chamber side in the axial direction, and not only does it becomes difficult to form the suitable oil film but also the oil is scraped up to the combustion chamber. Moreover, there is also a possibility that the ring body directly contacts with the inner circumferential surface of the cylinder, and the ring body and the inner circumferential surface of the cylinder may be abraded. In this regard, with the above configuration, even when the ring body is inclined the most within the ring groove while the piston moves to the combustion chamber side, the end part of the first curved surface on the opposite side from the tip portion forms a wedge-shaped gap with the inner circumferential surface of the cylinder without contacting with the inner circumferential surface of the cylinder. In other words, the first curved surface extends from the tip portion to the opposite side from the second curved surface, so that even when the ring body is inclined the most, the ridge portion formed between the first curved surface and the side surface of the ring body on the combustion chamber side does not contact with the inner circumferential surface of the cylinder. Further, in addition to the ridge portion not contacting with the inner circumferential surface of the cylinder, the first curved surface has a sufficient area for the wedge-shaped gap to be formed with the inner circumferential surface of the cylinder when the ring body is inclined the most. By the wedge effect at the end part of the first curved surface, even when the ring body is inclined the most, the oil film with suitable thickness can be formed.

The cross sections of the first and second curved surfaces may have an arc shape. A curvature radius of the first curved surface may be larger than a curvature radius of the second curved surface.

In other words, with the configuration in which the cross sections of the first and second curved surfaces have the arc shape, the first curved surface is designed to have a larger curvature radius than that of the second curved surface, so that when the points are taken on the first curved surface and the second curved surface at the same distance from the tip portion in the axial direction and the positional change rate of the point on the first curved surface is compared with the positional change rate of the point on the second curved surface, the change rate of the first curved surface becomes lower than the change rate of the second curved surface. Thus, the above configuration can be achieved even when the cross sections of the first and second curved surfaces have the arc shape. Further, by designing the first and second curved surfaces to have the cross sections of the arc shape, the first and second curved surfaces can be accurately and easily be formed.

The tip portion may be offset from a central portion of the sliding surface in the axial direction, to the opposite side from the combustion chamber.

With the above configuration, by offsetting the tip portion from the central portion of the sliding surface in the axial direction, to the opposite side from the combustion chamber, the first curved surface can be extended. Since the positional change rate of the first curved surface to the radially inward side with respect to the distance from the tip portion in the axial direction is comparatively small, even at a point on the first curved surface far from the tip portion in the axial direction, the curvature amount to the radially inward side is small. With such a small positional change rate to the radially inward side with respect to the distance from the tip portion in the axial direction, when the ring body is inclined while the piston moves to the combustion chamber side, the ridge portion formed between the first curved surface and the side surface of the ring body on the combustion chamber side easily contacts with the inner circumferential surface of the cylinder. In this regard, by extending the first curved surface, even when the ring body is inclined while the piston moves to the combustion chamber side, the contact between the first curved surface and the inner circumferential surface of the cylinder can be maintained.

The curvature radius of the first curved surface may be smaller than a radial dimension taken from an inner circumferential edge of the ring body to the tip portion.

In other words, the ring body tilts within the ring groove with respect to its inner circumferential edge when the piston moves. Therefore, by designing the first curved surface to have the curvature radius smaller than the radial dimension taken from the inner circumferential edge of the ring body to the tip portion, when the ring body tilts, the ring body can be prevented from being pushed radially inward by the reaction of the inner circumferential surface of the cylinder against the ring body, in other words, the increase of the sliding resistance can be prevented. Specifically, in the case where the curvature radius of the first curved surface is smaller than the radial dimension taken from the inner circumferential edge of the ring body to the tip portion, when the ring body tilts, a radial distance from the inner circumferential edge of the ring body to the contact point of the first curved surface with the inner circumferential surface of the cylinder is smaller than the radial dimension taken from the inner circumferential edge of the ring body to the tip portion. Therefore, the pushing force of the ring body against the inner circumferential surface of the cylinder becomes small, and thus, the sliding resistance of the ring body is reduced.

The curvature radius of the second curved surface may be between 0.09 mm and 0.5 mm.

The sliding surface of one of the ring bodies on the opposite side from the combustion chamber may have the first and second curved surfaces.

In other words, the one of the ring bodies on the opposite side from the combustion chamber greatly contributes to scraping off the oil when the piston moves to the opposite side from the combustion chamber. Further, the ring body on the opposite side from the combustion chamber is provided with the first curved surface on the combustion chamber side and the second curved surface on the opposite side from the combustion chamber. Since the second curved surface has a large inclination with respect to the inner circumferential surface of the cylinder compared to the first curved surface, it causes a high effect in scraping off the oil. As described above, by providing the second curved surface to the ring body on the opposite side from the combustion chamber such that the second curved surface is located on the opposite side from the combustion chamber with respect to the first curved surface, the oil can effectively be scraped off.

DETAILED DESCRIPTION OF EMBODIMENTS

Here, embodiments of the present invention are exemplarily described in detail with reference to the appended drawings.

First Embodiment

Figure 1:
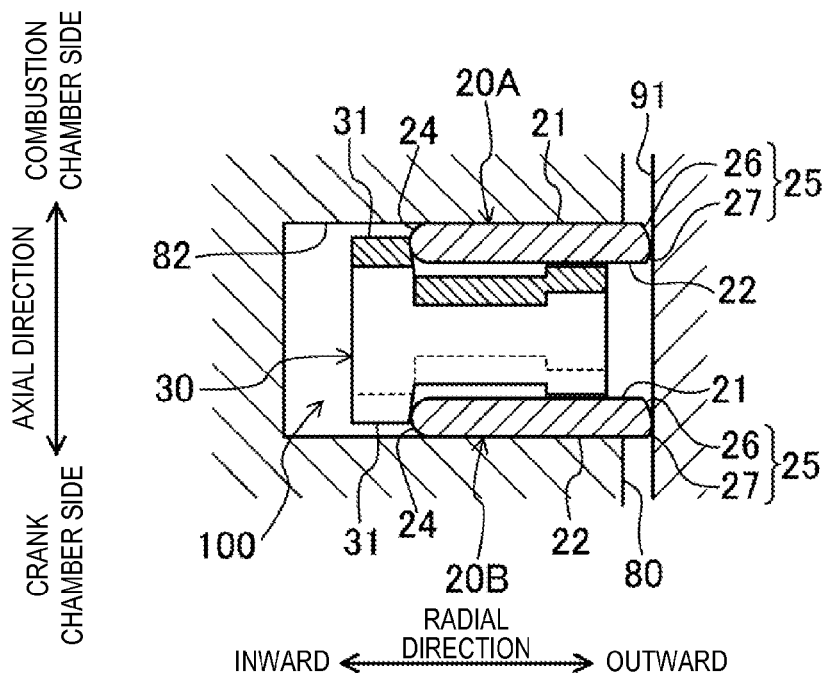
FIG. 1 is a cross-sectional view of an oil ring according to a first embodiment of the present invention.
Figure 2:
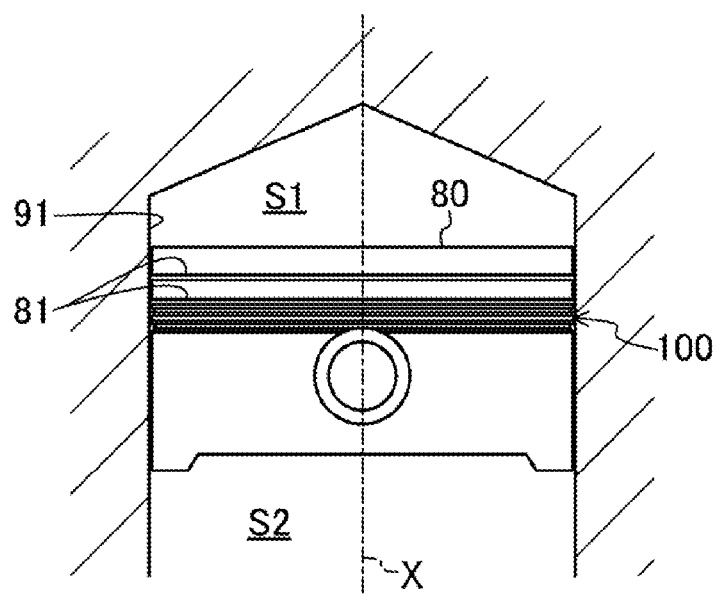
FIG. 2 is a schematic view of a piston attached with the oil ring.
Figure 3:
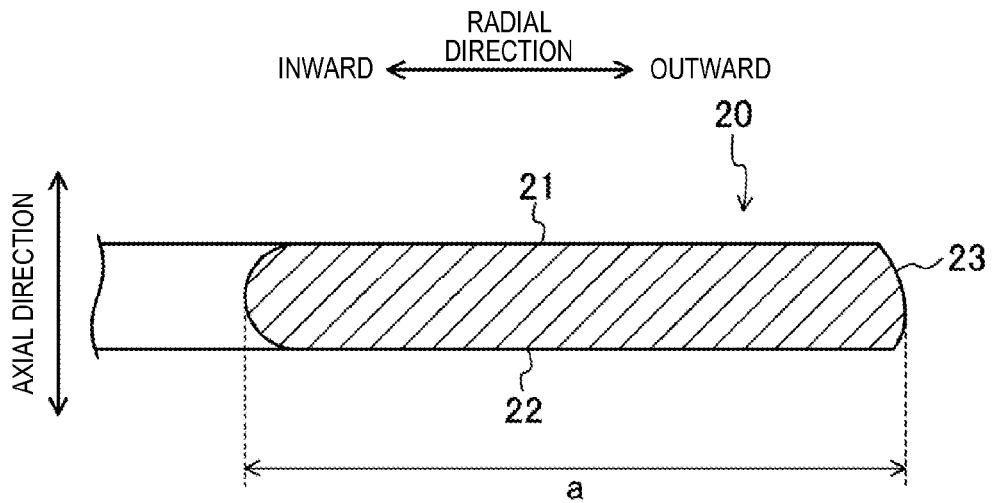
FIG. 3 is a cross-sectional view of a side rail.

FIG. 1 is a cross-sectional view of an oil ring 100 according to a first embodiment of the present invention, in which the view is taken along a plane perpendicular to a circumferential direction of the oil ring 100. FIG. 2 is a schematic view of a piston 80 attached with the oil ring 100. FIG. 3 is a cross-sectional view of a side rail 20, in which the view is taken along a plane perpendicular to a circumferential direction of the side rail 20.

The piston 80 is formed with three ring grooves, among which the first and second ring grooves from a side closer to a combustion chamber S1 are attached with compression rings 81, respectively.

The oil ring 100 is attached to the third ring groove 82 (see FIG. 1). The oil ring 100 slides on a cylinder inner circumferential surface 91. An X-axis that is the central axis of the oil ring 100 aligns with the central axis of the piston 80. Hereinafter, unless otherwise described, the "axial direction" indicates a direction along the X-axis, the "radial directions" indicate radial directions of the oil ring 100 centering on the X-axis, and the "circumferential direction" indicates a circumferential direction of the oil ring 100 around the X-axis.

The oil ring 100 includes a pair of side rails 20 for sliding on the cylinder inner circumferential surface 91, and a spacer-expander 30 for biasing the side rails 20 at least radially outwardly, i.e., the oil ring 100 is a so-called three-piece oil ring. Note that in a case of differentiating the two side rails 20 below, the side rail 20 located on the combustion chamber S1 side is referred to as the first side rail 20A, and the side rail 20 located on the crank chamber S2 side (the opposite side from the combustion chamber) is referred to as the second side rail 20B. Each of the side rails 20 may be referred to as the ring body. The spacer-expander 30 may be referred to as the expander.

The side rail 20 is annularly formed around the X-axis (common axis). The side rail 20 has an open joint, in other words, a ring shape with a part cut off. The side rail 20 can be formed by rolling and bending a string of steel member having a predetermined cross section. Here, the side rail 20 is formed to have a pair of flat side surfaces 21 and 22 in parallel to each other, an inner circumferential surface 24 suitably bulging radially inward, and an outer circumferential surface 23 suitably bulging radially outward. The outer circumferential surface may be further ground to have a desirable shape. The outer circumferential surface of the side rail 20 may be formed with a hard film having a shape corresponding to the outer circumferential surface. The hard film may be formed by any of various surface treatments, such as hard chrome plating, nitriding (Graphene Nanoribbon: GNR), ion plating (Physical Vapor Deposition: PVD).

In the side rail 20, the pair of side surfaces 21 and 22 face each other in the axial direction, the outer circumferential surface 23 connects the side surface 21 with the side surface 22, and the inner circumferential surface 24 connects the side surface 21 with the side surface 22. The outer circumferential surface 23 serves as a sliding surface for sliding on the cylinder inner circumferential surface 91. The outer circumferential surface 23 bulges radially outward. The inner circumferential surface 24 bulges radially inward. A cross-sectional shape of the side rail 20 taken along the plane perpendicular to the circumferential direction is uniform over the entire circumference.

The spacer expander 30 biases the side rails 20 radially outward. The spacer expander 30 is annularly formed around the X-axis, and made of steel to be elastically deformable radially inward and outward. The spacer expander 30 has a convex part protruding to one side (first side) of the axial direction and a concave part dented to the other side (second side) of the axial direction, and has a wavy shape in the circumferential direction by alternately arranging the convex and concave parts. The wavy section forms seating surfaces for the side rails 20. Further, ear portions 31 for pushing the inner circumferential surfaces 24 of the side rails 20 are provided to an inner circumferential edge portion of the spacer expander 30 so as to protrude to both sides of the axial direction, respectively.

The side rails 20 are disposed on both sides of the wavy section of the spacer expander 30 in the axial direction, respectively, so that the ear portions 31 contact with the inner circumferential surfaces of the side rails 20, respectively.

The oil ring 100 is contained inside the ring groove 82 in the state where the side rails 20 and the spacer expander 30 are compressed radially inward, in other words, the open joints of the side rails 20 are substantially closed and the ear portions 31 of the spacer expander 30 push the side rails 20 radially outward.

Here, in each ear portion 31, the section that contacts with the inner circumferential surface of the side rail 20 has an inclining surface with respect to the X-axis. Specifically, the inclining surface of the ear portion 31 inclines radially inward as it projects from the inner circumferential edge portion to the corresponding side of the axis direction. Therefore, the side rails 20 are not only pushed radially outward by the ear portions 31 but also pushed against side walls (the walls facing the axial direction) of the ring groove 82. As a result, the side rails 20 contact with the cylinder inner circumferential surface 91 and also the side walls of the ring groove 82.

The oil ring 100 configured as above slides on the cylinder inner circumferential surface 91 when the piston 80 moves. Here, the oil ring 100 forms an oil film with suitable thickness on the cylinder inner circumferential surface 91 and scrapes off unnecessary oil to collect it.

Figure 4:
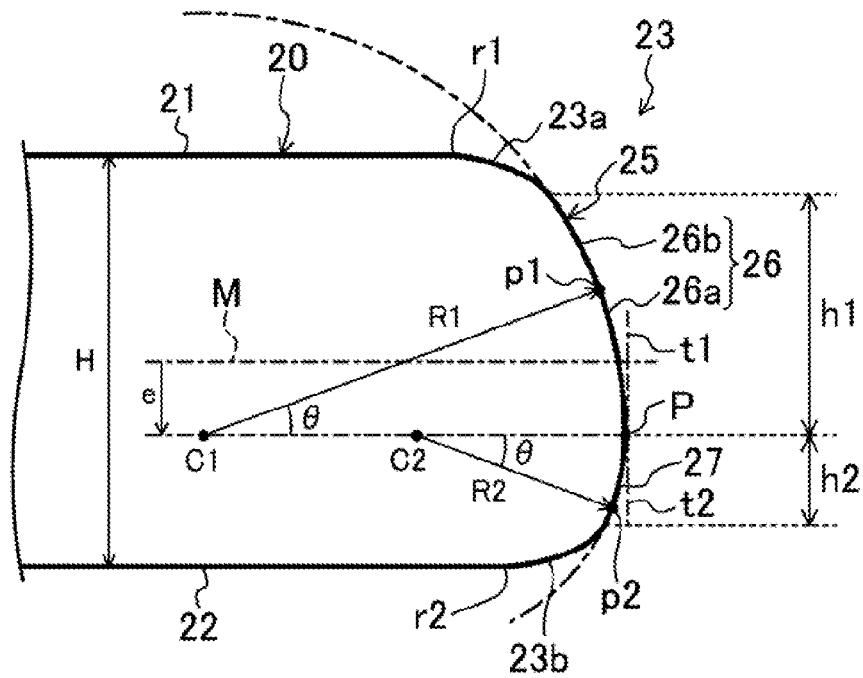
FIG. 4 is an enlarged cross-sectional view of an outer circumferential surface of the side rail.

Next, the shape of the outer circumferential surface 23 of the side rail 20 is described in detail. FIG. 4 is an enlarged cross-sectional view of the outer circumferential surface 23 of the side rail 20, in which the hatching for the cross section is omitted.

The outer circumferential surface 23 includes a sliding surface 25 for sliding on the cylinder inner circumferential surface 91, a first connection surface 23a connecting the sliding surface 25 with one side surface 21, and a second connection surface 23b connecting the sliding surface 25 with the other surface 22. The sliding surface 25 bulges radially outward and has a tip portion P where the side rail 20 has a largest diameter. The sliding surface 25 has a first curved surface 26 on the first side of the tip portion P, and a second curved surface 27 on the second side of the tip portion P. The tip portion P is offset to the second side from the center of the sliding surface 25 in the axial direction. Thus, the sliding surface 25 has a shape which is asymmetric with respect to a plane passing through the axial center of the side rail 20 perpendicularly to the X-axis, in other words, a shape which is vertically asymmetric in FIG. 4.

Specifically, the first and second curved surfaces 26 and 27 have an arc shape in a cross-section taken along the plane perpendicular to the circumferential direction. Further, a curvature radius R1 of the first curved surface 26 in the cross section is larger than a curvature radius R2 of the second curved surface 27 in the cross section. For example, the curvature radius R1 is between 0.21 mm and 0.45 mm, and the curvature radius R2 is between 0.09 mm and 0.15 mm. Hereinafter, unless otherwise described, the "curvature radius" means a curvature radius in a cross section taken along the plane perpendicular to the circumferential direction.

Moreover, the first and second curved surfaces 26 and 27 are connected with each other, while tangent lines t1 and t2 to the cross section at the tip portion P align with each other.

Specifically, the tangent line t1 at the tip portion P in the cross section of the first curved surface 26 extends in parallel to the X-axis, and the tangent line t2 at the tip portion P in the cross section of the second curved surface 27 also extends in parallel to the X-axis. As a result, the tip portion P (i.e., the connecting portion of the first and second curved surfaces 26 and 27) and a portion around the tip portion P form a surface continuously curving without an edge. Note that a center C1 of the curvature of the first curved surface 26 and a center C2 of the curvature of the second curved surface 27 are both on a straight line extending in one of the radial directions passing through the tip portion P.

By forming the connecting portion of the first and second curved surfaces 26 and 27 to curve as above, the pressure on the tip portion P decreases, and thus, the sliding resistance can be reduced and abrasion of the tip portion P and the cylinder inner circumferential surface 91 can be suppressed. Especially at top and bottom dead centers of the piston 80 where the sliding speed becomes zero, the tip portion P may contact with the cylinder inner circumferential surface 91. Therefore, by forming the connecting portion into a curved surface, a squeeze film effect is produced and the contact between the tip portion P and the cylinder inner circumferential surface 91 can be prevented. Even if the tip portion P contacts with the cylinder inner circumferential surface 91, the contact pressure can be reduced and, thus, the sliding resistance can be reduced and abrasion can be suppressed.

Here, when a distance from the tip portion P in the axial direction is x (note that 0≤x), a distance from the tip portion P to the radially inward side is y, the cross section of the first curved surface 26 is expressed by y=f1(x), and the cross section of the second curved surface 27 is expressed by y=f2(x), the following Equation 1 is satisfied with respect to an arbitrary x1 (note that 0≤x1<h2) in this embodiment.

$$f1'(x1) < f2'(x1) \quad (1)$$

Wherein f1'(x) is a differential function of f1(x), and f2'(x) is a differential function of f2(x).

According to this relationship, when a positional change rate to the radially inward side with respect to the distance from the tip portion P in the axial direction is compared between a point on the first curved surface 26 and a point on the second curved surface 27 taken at the same distance from the tip portion P in the axial direction, the positional change rate of the first curved surface 26 is lower than that of the second curved surface 27. Specifically, when the inclinations of the tangent lines with respect to the axial direction at two arbitrary points on the first and second curved surfaces 26 and 27 taken at the same distance from the tip portion P are compared to each other, the inclination of the tangent line of the first curved surface 26 is smaller than that of the second curved surface 27.

Note that in this embodiment, since the first and second curved surfaces 26 and 27 have the arc shape and the curvature radius of the first curved surface 26 is larger than that of the second curved surface 27, Equation 1 described above is satisfied.

Here, in forming an oil film with suitable thickness, the tangent line preferably has a small inclination. With a tangent line with small inclination, the wedge effect is easily produced and oil can be introduced between the sliding surface 25 and the cylinder inner circumferential surface 91 and, thus, the oil film with suitable thickness can be formed. In terms of scraping up the oil adhered to the cylinder inner circumferential surface 91, if the inclination of the tangent line is large, the wedge effect will be reduced and the scraped up amount of oil increases, whereas with the tangent line having a small inclination, the wedge effect can be enhanced and the scraped up amount of oil decreases.

In this embodiment, the side rail 20 on the combustion chamber S1 side is disposed on the seating surface of the spacer expander 30 such that the first curved surface 26 is arranged on the combustion chamber S1 side and the second curved surface 27 is arranged on the crank chamber S2 side, and the side rail 20 on the crank chamber S2 side is also disposed in the same arrangement. When the piston 80 moves to the combustion chamber S1 side, in each side rail 20, the surface on the combustion chamber S1 side is on the forward side in the moving direction with respect to the side rail 20, and when the piston 80 moves to the crank chamber S2 side, in each side rail 20, the surface on the crank chamber S2 side is on the forward side in the moving direction with respect to the side rail 20. Hereinafter, "the piston 80 elevates" means that the piston 80 moves to the combustion chamber S1 side, and "the piston 80 descends" means that the piston 80 moves to the crank chamber S2 side.

When the piston 80 elevates, the first side rail 20A on the combustion chamber S1 side greatly contributes in forming the oil film. When the piston 80 elevates, in the first side rail 20A, the first curved surface 26 is on the forward side in the moving direction. Since the tangent line of the first curved surface 26 has a comparatively small inclination as described above, the oil is easily introduced between the sliding surface 25 and the cylinder inner circumferential surface 91, and the oil film with suitable thickness is formed, and also the amount of oil scraped up to the combustion chamber S1 is reduced. In other words, when the piston 80 elevates, since the oil film with suitable thickness is formed, the sliding resistance can be reduced and the amount of oil scraped up to the combustion chamber S1 can also be reduced.

Note that the second side rail 20B on the crank chamber S2 side also somewhat contributes in forming the oil film. Also in the second side rail 20B, when the piston 80 elevates, the first curved surface 26 is on the forward side in the moving direction. Therefore, similar to the first side rail 20A, the oil film with suitable thickness is formed, and also the amount of oil scraped up to the combustion chamber S1 is reduced.

On the other hand, when the piston 80 descends, the second side rail 20B on the crank chamber S2 side greatly contributes in scraping the oil off. When the piston 80 descends, in the second side rail 20B, the second curved surface 27 is on the forward side in the moving direction. Since the tangent line of the second curved surface 27 has a comparatively large inclination as described above, the wedge effect is low, and the introduction amount of oil between the sliding surface 25 and the cylinder inner circumferential surface 91 is reduced, and thus, the oil adhered to the cylinder inner circumferential surface 91 can be scraped off rather effectively. In other words, when the piston 80 descends, the oil adhered to the cylinder inner circumferential surface 91 can effectively be scraped off.

Note that the first side rail 20A on the combustion chamber S1 side also somewhat contributes in scraping the oil off. Also in the first side rail 20A, when the piston 80 descends, the second curved surface 27 is on the forward side in the moving direction. Therefore, similar to the second side rail 20B, the oil adhered to the cylinder inner circumferential surface 91 can effectively be scraped off. Thus, the oil adhered to the cylinder inner circumferential surface 91 can effectively be scraped off by both of the first and second side rails 20A and 20B.

Figure 5:
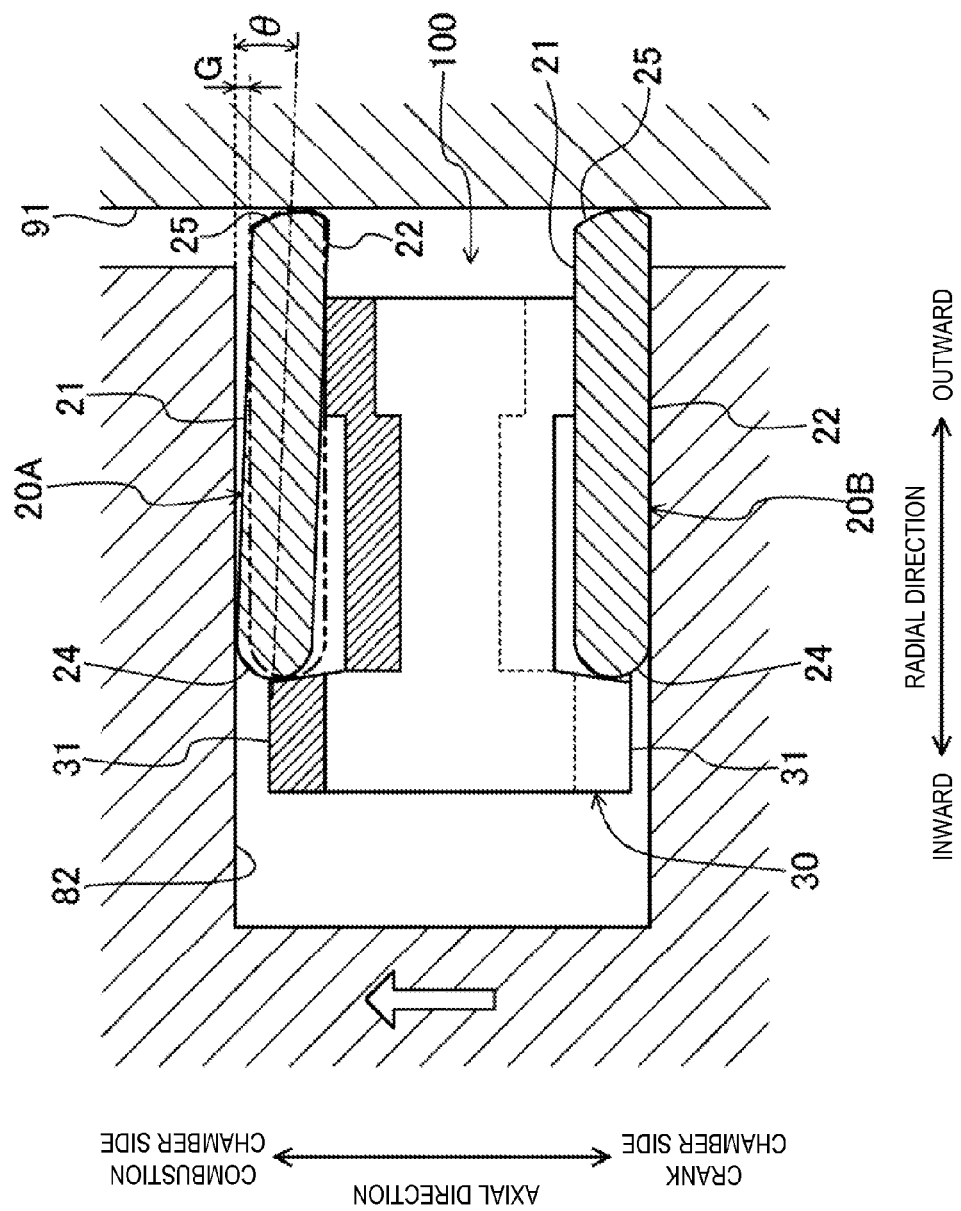
FIG. 5 is a schematic view of the oil ring when the piston elevates.
Figure 6:
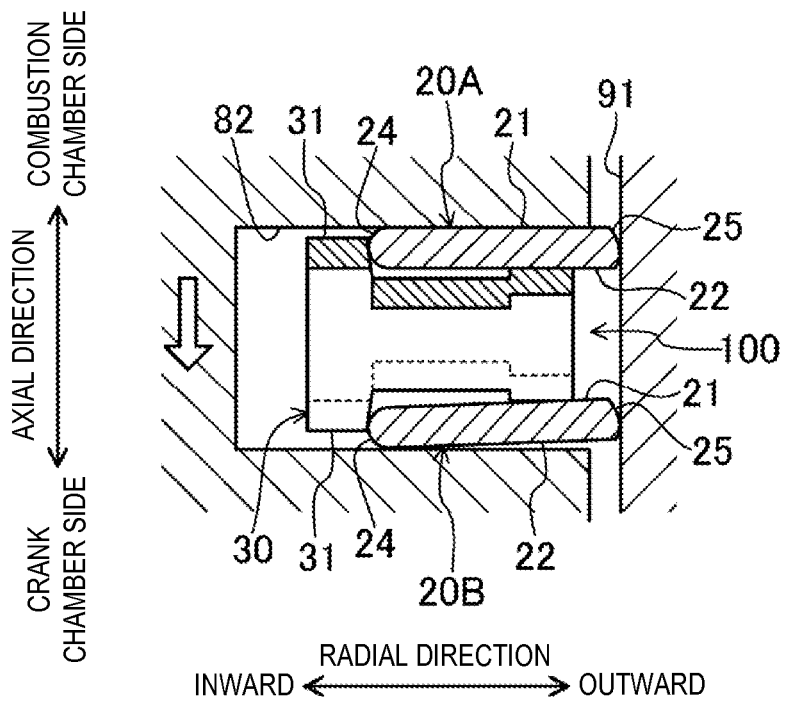
FIG. 6 is a schematic view of the oil ring when the piston descends.

With the oil ring 100 configured as above, the side rails 20 may tilt within the ring groove 82 when the piston 80 moves. FIG. 5 is a schematic view of the oil ring 100 when the piston 80 elevates. FIG. 6 is a schematic view of the oil ring 100 when the piston 80 descends.

Specifically, as illustrated in FIG. 5, the ring groove 82 and the oil ring 100 have a clearance G therebetween in a groove width direction of the ring groove 82 (i.e., axial direction), and the side rails 20 can slightly move in the groove width direction. The clearance G is extremely small, for example about 0.1 mm. Basically, one of the side rails 20 is pushed against the side wall of the ring groove 82 by the ear portion 31 of the spacer expander 30, and contacts with the side wall. When the piston 80 moves, the side rail 20 slides on the cylinder inner circumferential surface 91 and receives a friction force from the cylinder inner circumferential surface 91 against the moving direction of the piston 80. As a result, the side rail 20 contacts with the side wall of the ring groove 82 at a radially inward portion while it inclines rearward of the moving direction as it extends radially outward.

Figure 7:
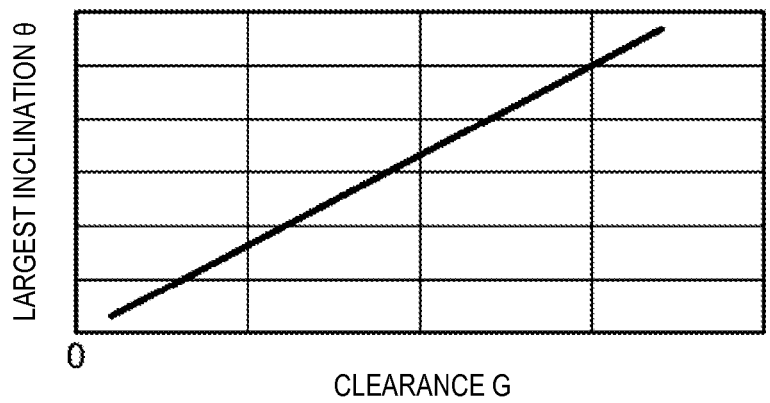
FIG. 7 is a chart illustrating relationship between a clearance and a largest inclination.

FIG. 7 is a chart illustrating the relationship between the clearance G and a largest inclination θ. The largest inclination θ of the side rail 20 is determined by the clearance G within the ring groove 82 in the axial direction of the oil ring 100. Since the clearance G is extremely small, the largest inclination θ is substantially in proportion to the clearance G.

Note that such tilting occurs in one of the side rails 20 which is positioned forward in the moving direction of the piston 80 compared to the other side rail 20, and the other side rail 20 is pushed against the side wall of the ring groove 82 without inclining. For example, when the piston 80 elevates, the first side rail 20A is inclined and the second side rail 20B is pushed against the side wall of the ring groove 82 without inclining as illustrated in FIG. 5. On the other hand, when the piston 80 descends, the second side rail 20B is inclined and the first side rail 20A is pushed against the side wall of the ring groove 82 without inclining as illustrated in FIG. 6.

Here, the first and second curved surfaces 26 and 27 have an area large enough that the cylinder inner circumferential surface 91 contacts with one of the first and second curved surfaces 26 and 27 even when the side rail 20 is inclined the most. Specifically, as illustrated in FIG. 4, the first curved surface 26 has a cross section extending from the tip portion P to one side of the axial direction, over a point p1 forming the largest inclination θ from the tip portion P centering on the center C1. Moreover, the second curved surface 27 has a cross section extending from the tip portion P to the other side of the axial direction, over a point p2 forming the largest inclination θ from the tip portion P centering on the center C1.

Figure 8:
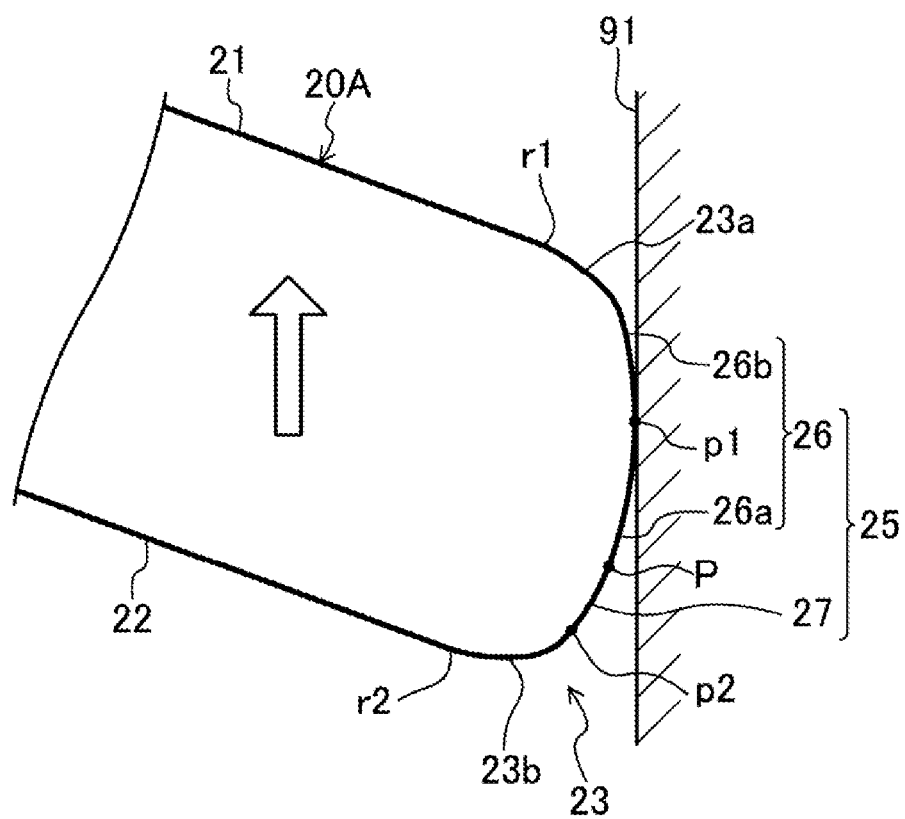
FIG. 8 is an enlarged cross-sectional view of a first side rail when the piston elevates.

FIG. 8 is an enlarged cross-sectional view of the first side rail 20A when the piston 80 elevates. Note that the hatching for the cross section is omitted. When the piston 80 elevates, since the first side rail 20A is inclined to the crank chamber S2 side as it extends radially outward as described above, the contact point of the first side rail 20A with the cylinder inner circumferential surface 91 moves from the tip portion P to the first curved surface 26. Then, when the first side rail 20A is inclined the most to the crank chamber S2 side, the first side rail 20A contacts with the cylinder inner circumferential surface 91 at the point p1 of the first curved surface 26 as illustrated in FIG. 8. Thus, even when the first side rail 20A is inclined the most to the crank chamber S2 side, the contact point with the cylinder inner circumferential surface 91 is on the first curved surface 26. Thereby, not only a ridge portion r1 formed between the side surface 21 and the first connection surface 23a, but also the first connection surface 23a, is prevented from being in contact with the cylinder inner circumferential surface 91.

Figure 9:
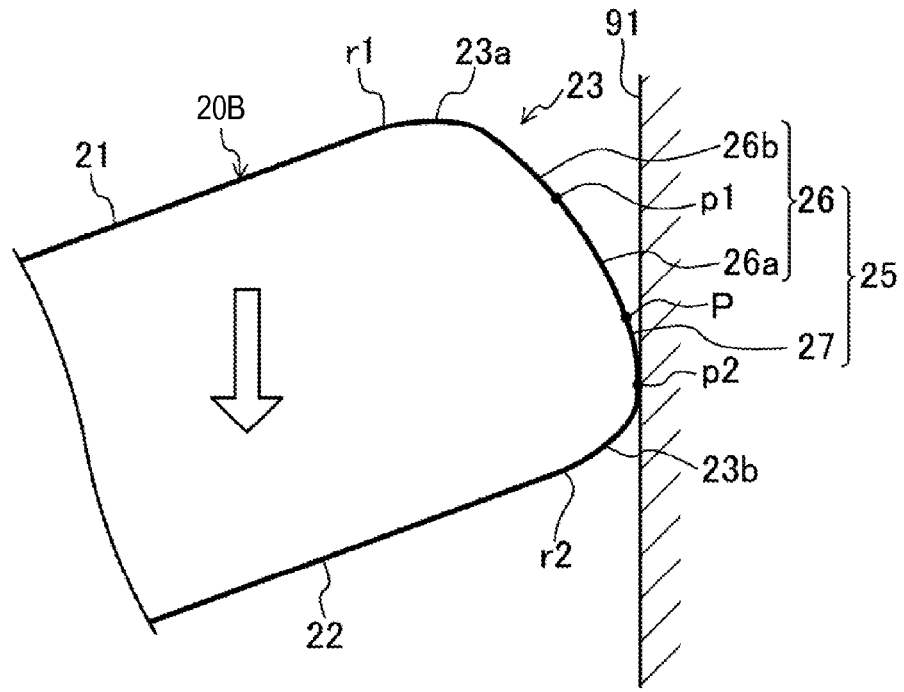
FIG. 9 is an enlarged cross-sectional view of the second side rail when the piston descends.

FIG. 9 is an enlarged cross-sectional view of the second side rail 20B when the piston 80 descends. Note that in FIG. 9, the hatching for the cross section is omitted. When the piston 80 descends, since the second side rail 20B is inclined to the combustion chamber S1 side as it extends radially outward as described above, the contact point of the second side rail 20B with the cylinder inner circumferential surface 91 moves from the tip portion P to the second curved surface 27. Then, when the second side rail 20B is inclined the most to the combustion chamber S1 side, the second side rail 20B contacts with the cylinder inner circumferential surface 91 at the point p2 of the second curved surface 27 as illustrated in FIG. 9. Thus, even when the second side rail 20B is inclined the most to the combustion chamber S1 side, the contact point with the cylinder inner circumferential surface 91 is on the second curved surface 27. Thereby, not only a ridge portion r2 formed between the side surface 22 and the second connection surface 23b, but also the second connection surface 23b is prevented from being in contact with the cylinder inner circumferential surface 91.

Here, since the first curved surface 26 has the large curvature R1, the length of arc corresponding to the largest inclination θ is long. In other words, in the cross section of the sliding surface 25, the length from the tip portion P to the point p1 is longer than the length from the tip portion P to the point p2. Thus, as illustrated in FIG. 4, by offsetting the tip portion P from an axial center M of the side rail 20 to the second curved surface 27 side by an offset amount e, the first curved surface 26 is extended. Specifically, an axial dimension h1 of the first curved surface 26 is larger than an axial dimension h2 of the second curved surface 27.

For example, if the tip portion P is located at the axial center of the side rail 20, the area of the first curved surface 26 corresponding to the largest inclination θ of the side rail 20 may not be secured. In such a case, while the side rail 20 inclines to the largest inclination θ, not only the ridge portion r1 contacts with the cylinder inner circumferential surface 91, but the first connection surface 23a contacts with the cylinder inner circumferential surface 91. In this regard, by axially offsetting the tip portion P from the axial center M to the second curved surface 27 side, the first curved surface 26 can be extended, and thus, the area of the first curved surface 26 corresponding to the largest inclination θ becomes easier to secure.

Additionally, the first curved surface 26 has a sliding section 26a extending from the point p1 to the tip portion P, and an extension section 26b extending from the point p1 to the opposite side from the tip portion P. The length of the extension section 26b in the cross section is longer than that of a section of the second curved surface 27 extending from the point p2 to the opposite side from the tip portion P. Specifically, since the major function required for the second curved surface 27 is to scrape off the oil adhered to the cylinder inner circumferential surface 91, in terms of function, it can be considered sufficient as long as the second curved surface 27 has an area slightly larger than the area corresponding to the largest inclination θ so that contact between the ridge portion r2 and the cylinder inner circumferential surface 91 can be prevented. On the other hand, since the major function required for the first curved surface 26 is to form the oil film with suitable thickness, when the piston 80 elevates, the first curved surface 26 preferably runs on the oil film formed on the cylinder inner circumferential surface 91 when the piston 80 descends, without scraping up the oil. Therefore, for the first curved surface 26, it is not sufficient to simply prevent contact between the ridge portion r1 and the cylinder inner circumferential surface 91, but the first curved surface 26 needs to form the oil film with suitable thickness between the first curved surface 26 and the cylinder inner circumferential surface 91 by the suitable wedge effect. For this reason, the extension section 26b of the first curved surface 26 has a length in the cross section, sufficiently long in forming a wedge-shaped gap with the cylinder inner circumferential surface 91 when the side rail 20 is inclined the most to the crank chamber S2 side.

As described above, the sliding section 26a may slide on the cylinder inner circumferential surface 91 when the side rail 20 tilts. On the other hand, the extension section 26b does not slide on the cylinder inner circumferential surface 91 even when the side rail 20 is inclined to the maximum degree; however, it exerts the wedge effect together with the cylinder inner circumferential surface 91.

Preferably, the axial dimension of the extension section 26b is larger than the axial dimension h2 of the second curved surface 27. Specifically, in the horizontal state of the side rail 20, the area of the second curved surface 27 forming the wedge shape with the cylinder inner circumferential surface 91 becomes the largest, in other words, the largest wedge effect can be obtained, and the thickness of the oil film becomes the largest. On the other hand, in the most inclined state of the side rail 20 when the piston 80 elevates, the extension section 26b forms the wedge shape with the cylinder inner circumferential surface 91. Here, since the axial dimension of the extension section 26b is larger than the axial dimension h2 of the second curved surface 27 and the curvature radius R1 of the first curved surface 26 is larger than the curvature radius R2 of the second curved surface 27, the wedge effect produced by the extension section 26b is larger than the largest wedge effect which can be produced by the second curved surface 27 and the cylinder inner circumferential surface 91. In other words, the wedge effect produced under the worst condition while the piston 80 elevates is larger than the wedge effect produced under the optimal condition while the piston 80 descends. As a result, even if the thickest oil film is formed when the piston 80 descends, the first curved surface 26 easily runs on the oil film when the piston 80 elevates, and the scraping up of the oil film can be suppressed. Thus, the sliding resistance when the piston 80 elevates can be reduced, and also the oil loss through the piston can be reduced.

Further, the curvature radius R1 of the first curved surface 26 is smaller than a radial dimension "a" from an inner circumferential edge of the side rail 20 to the tip portion P (see FIG. 3). Thus, an increase in reaction of the cylinder inner circumferential surface 91 against the side rail 20 when the side rail 20 tilts can be prevented. Specifically, in the state where the side rail 20 is not inclined, the sliding surface 25 contacts with the cylinder inner circumferential surface 91 at the tip portion P, and a radial distance from the inner circumferential edge of the side rail 20 to the contact point of the sliding surface 25 with the cylinder inner circumferential surface 91 corresponds to the radial dimension a of the side rail 20. On the other hand, when the side rail 20 tilts, the contact point of the sliding surface 25 with the cylinder inner circumferential surface 91 moves along the sliding surface 25 from the tip portion P. Here, if the curvature radius R1 of the first curved surface 26 is larger than the radial dimension a of the side rail 20, the radial distance from the inner circumferential edge of the side rail 20 to the contact point of the sliding surface 25 with the cylinder inner circumferential surface 91 becomes larger than the radial dimension a of the side rail 20. As a result, the reaction of the cylinder inner circumferential surface 91 against the side rail 20 increases and the side rail 20 and the spacer expander 30 are compressed more to the radially inward side, which indicates an increase of the sliding resistance of the side rail 20. In this regard, by designing the curvature radius R1 of the first curved surface 26 to be smaller than the radial dimension a of the side rail 20, when the side rail 20 tilts, the radial distance from the inner circumferential edge of the side rail 20 to the contact point of the sliding surface 25 with the cylinder inner circumferential surface 91 becomes smaller than the radial dimension a of the side rail 20. Thus, the increase of the sliding resistance of the side rail 20 can be prevented.

Further, the curvature radius of the second curved surface 27 is smaller than the curvature radius of the first curved surface 26, preferably between 0.09 mm and 0.15 mm. By designing the curvature radius to be 0.09 mm or larger, the second curved surface 27 can easily be formed. In other words, if the curvature radius is smaller than 0.09 mm, the second curved surface 27 becomes difficult to be formed. Moreover, by designing the curvature radius to 0.15 mm or smaller, when the side rail 20 slides with the second curved surface 27 on the forward side in the moving direction, the oil amount which enters between the second curved surface 27 and the cylinder inner circumferential surface 91 can be reduced, and the oil can effectively be scraped off.

Note that the first and second connection surfaces 23a and 23b are formed to have a curved cross section. Moreover, the first and second connection surfaces 23a and 23b may have any cross section as long as neither of them contacts with the cylinder inner circumferential surface 91 even when the side rail 20 is inclined. For example, they may have a straight cross section.

As described above, the oil ring 100 includes the two annular side rails 20 having the common axis and arranged in tandem, and the spacer expander 30 for biasing the side rails 20 radially outward. The sliding surface 25 is formed at each outer circumference of the side rail 20 to bulge radially outward and slides on the cylinder inner circumferential surface 91. The sliding surface 25 of the first side rail 20A on the combustion chamber S1 side between the two side rails 20 has the tip portion where the first side rail 20A has the largest diameter, the first curved surface 26 on the combustion chamber S1 side with respect to the tip portion P, and the second curved surface 27 on the crank chamber S2 side with respect to the tip portion P. In the cross sections of the first and second curved surfaces taken along the plane perpendicular to the circumferential direction, the first and second curved surfaces 26 and 27 are connected with each other while the tangent lines t1 and t2 to the cross sections at the tip portion P align with each other. In the cross sections of the first and second curved surfaces 26 and 27, when the positional change rate of a point on the first curved surface 26 is compared with a positional change rate of a point on the second curved surface 27, the positional change rate of the first curved surface 26 is lower than that of the second curved surface 27, the positional change rate indicating the positional change to the radially inward side with respect to the distance from the tip portion P in the axial direction, the point on the first curved surface 26 and the point on the second curved surface 27 being taken at the same distance from the tip portion in the axial direction.

By this configuration, the suitable oil film can be formed and also the scraped up amount of oil can be reduced when the piston 80 elevates, and the oil can effectively be scraped off when the piston 80 descends. As a result, the sliding resistance of the piston 80 can be reduced, and the oil consumption can be reduced.

Second Embodiment

Figure 10:
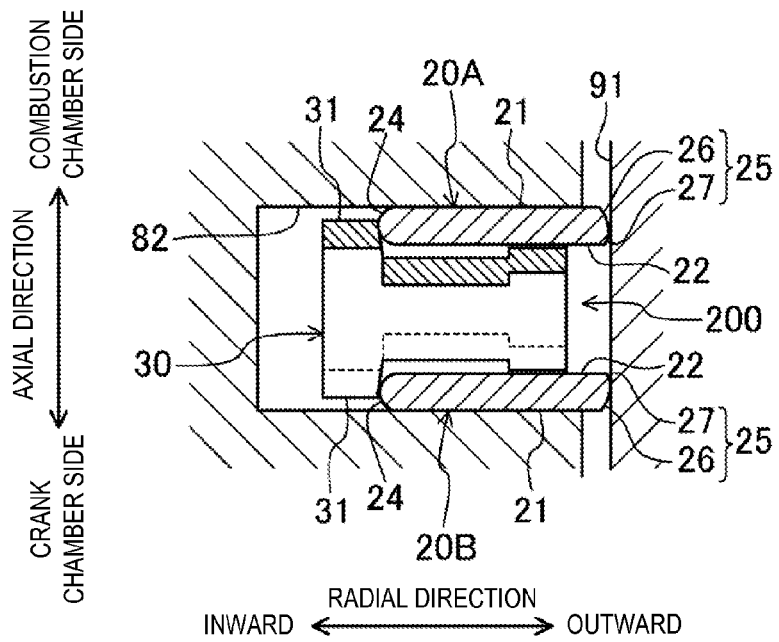
FIG. 10 is a cross-sectional view of an oil ring according to a second embodiment of the present invention.

Next, an oil ring 200 of a second embodiment is described. FIG. 10 is a cross-sectional view of the oil ring 200 according to the second embodiment of the present invention, in which the view is taken along the plane perpendicular to the circumferential direction of the oil ring 200.

The oil ring 200 has a different orientation of the second side rail 20B from the oil ring 100 of the first embodiment. Specifically, in the oil ring 200, the second side rail 20B is disposed such that the first curved surface 26 is arranged on the crank chamber S2 side and the second curved surfaced 27 is arranged on the combustion chamber S1 side.

Also with such a configuration, similar operations and effects to the oil ring 100 can be obtained. Specifically, when the piston 80 elevates, the first side rail 20A slides on the cylinder inner circumferential surface 91, with the first curved surface 26 located on the forward side of the moving direction. Therefore, when the piston 80 elevates, the oil film with suitable thickness is formed by the first side rail 20A and the amount of oil scraped up to the combustion chamber S1 is reduced. Note that when the piston 80 elevates, the second side rail 20B slides on the cylinder inner circumferential surface 91 at the rear of the first side rail 20A. Since the second side rail 20B has the second curved surface 27 on the forward side of the moving direction, it easily scrapes up the oil adhered to the cylinder inner circumferential surface 91. However, since the second side rail 20B is located on the crank chamber S2 side with respect to the first side rail 20A, the oil scraped up by the second side rail 20B does not flow across the first side rail 20A to the combustion chamber S1 side. Moreover, the oil scraped up by the second side rail 20B is scraped off by the first side rail 20A when the piston 80 descends.

On the other hand, when the piston 80 descends, the second side rail 20B slides on the cylinder inner circumferential surface 91, with the first curved surface 26 located on the forward side of the moving direction. Although the first curved surface 26 has a weaker oil scraping effect compared to the second curved surface 27, the amount of oil scraped off by the first curved surface 26 is still sufficient. Additionally, the first side rail 20A slides on the cylinder inner circumferential surface 91, with the second curved surface 27 on the forward side of the moving direction, at the rear of the second side rail 20B. Therefore, the oil adhered to the cylinder inner circumferential surface 91 after the second side rail 20B passes thereover is scraped off by the first side rail 20A. Thus, even if the oil scraping effect of the second side rail 20B is weak, the first side rail 20A compensates for the weak effect, and as a result, the oil can effectively be scraped off by the oil ring 200 as a whole.

Third Embodiment

Figure 11:
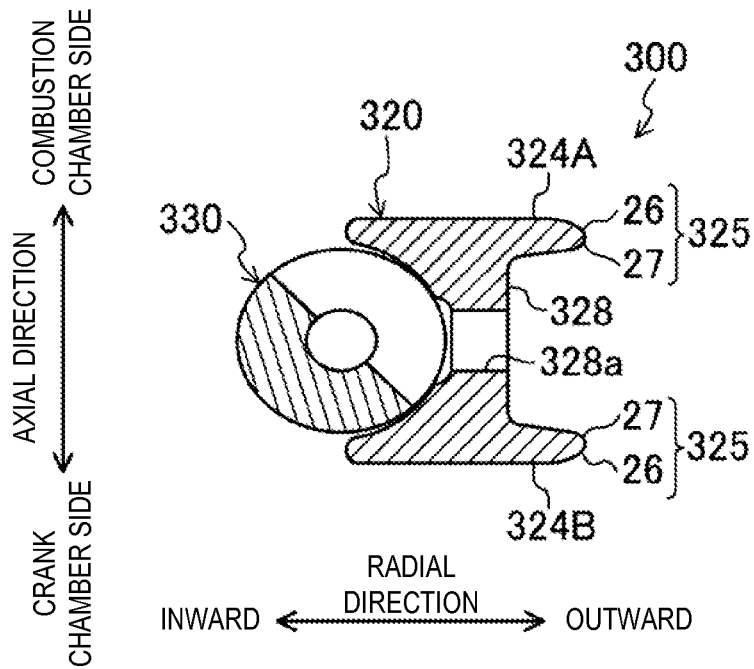
FIG. 11 is a cross-sectional view of an oil ring according to a third embodiment of the present invention.

Next, an oil ring 300 according to a third embodiment is described. FIG. 11 is a cross-sectional view of the oil ring 300 according to the third embodiment of the present invention, in which the view is taken along the plane perpendicular to the circumferential direction of the oil ring 300.

The oil ring 300 includes a ring body 320 and a coil expander 330, i.e., the oil ring 300 is a so-called two-piece oil ring. The coil expander 330 may be referred to as the expander.

The ring body 320 is annularly formed around the X-axis. The ring body 320 has an open joint, in other words, a ring shape with a part cut off. Two annular slide parts 324 having the common axis and arranged in tandem are provided at an outer circumference of the ring body 320. The two slide parts 324A and 324B are connected with each other by a cylindrical web 328. A plurality of oil returning holes 328$a$ are formed to penetrate the web 328 in the radial directions and align in the circumferential direction. Note that in a case of differentiating the two slide parts 324A and 324B, the slide part on the combustion chamber S1 side is referred to as the first slide part 324A and the side part on the crank chamber S2 side is referred to as the second slide part 324B.

A sliding surface 325 for sliding on the cylinder inner circumferential surface 91 is formed at an outer circumferential surface of each slide part 324. The sliding surface 325 bulges radially outward. A cross section of the ring body 320 taken along the plane perpendicular to the circumferential direction is uniform over the entire circumference.

The coil expander 330 biases the ring body 320 radially outward. The coil expander 330 is annularly formed around the X-axis by a spiral spring to be elastically deformable radially inward and outward.

The coil expander 330 is disposed inward of the ring body 320, and contacts with an inner circumferential edge of the ring body 320.

The oil ring 300 is contained inside the ring groove 82 in a state where the ring body 320 and the coil expander 330 are compressed radially inward, in other words, the open joint of the ring body 320 is substantially closed and the coil expander 330 pushes the ring body 320 radially outward. As a result, the ring body 320 contacts with the cylinder inner circumferential surface 91.

The oil ring 300 configured as above slides on the cylinder inner circumferential surface 91 when the piston 80 moves. Here, the oil ring 300 forms an oil film with suitable thickness on the cylinder inner circumferential surface 91, and also scrapes off unnecessary oil and collects it.

The sliding surface 325 of the ring body 320 has first and second curved surfaces 26 and 27 similar to the side rail 20. Specifically, the first slide part 324A is formed with the first curved surface 26 on the combustion chamber S1 side and the second curved surface 27 on the crank chamber S2 side. On the other hand, the second slide part 324B is formed with the first curved surface 26 on the crank chamber S2 side and the second curved surface 27 on the combustion chamber S1 side.

The oil ring 300 configured as above exerts similar operations and effects to the oil ring 100. Specifically, when the piston 80 elevates, the first slide part 324A slides on the cylinder inner circumferential surface 91, with the first curved surface 26 located on the forward side of the moving direction. Therefore, when the piston 80 elevates, the oil film with suitable thickness is formed by the first slide part 324A and the amount of oil scraped up to the combustion chamber S1 is reduced. Note that when the piston 80 elevates, the second slide part 324B slides on the cylinder inner circumferential surface 91 at the rear of the first slide part 324A. Since the slide part 324B has the second curved surface 27 on the forward side of the moving direction, it easily scrapes up the oil adhered to the cylinder inner circumferential surface 91. However, since the second slide part 324B is located on the crank chamber S2 side with respect to the first slide part 324A, the oil scraped up by the second slide part 324B does not move across the first slide part 324A to the combustion chamber S1 side. Moreover, the oil scraped up by the second slide part 324B is discharged via the oil returning holes 328a. Furthermore, the oil scraped up by the second slide part 324B is scraped off by the first slide part 324A when the piston 80 descends.

On the other hand, when the piston 80 descends, the second slide part 324B slides on the cylinder inner circumferential surface 91, with the first curved surface 26 located on the forward side of the moving direction. Although the first curved surface 26 has a weaker oil scraping effect compared to the second curved surface 27, the amount of oil scraped off by the first curved surface 26 is still sufficient. Additionally, the first slide part 324A slides on the cylinder inner circumferential surface 91, with the second curved surface 27 on the forward side of the moving direction at the rearward of the second slide part 324B. Therefore, the oil adhered to the cylinder inner circumferential surface 91 after the second slide part 324B passes thereover is scraped off by the first slide part 324A. Thus, even if the oil scraping effect of the second slide part 324B is weak, the first slide part 324A compensates for the weak effect, as a result, the oil can effectively be scraped off by the oil ring 300 as a whole.

As described above, the oil ring 300 includes the ring body 320 annularly formed centering on the X-axis, and the coil expander 330 for biasing the ring body 320 radially outward. The two annular slide parts 324 arranged in tandem are provided at the outer circumference of the ring body 320. Each of the slide parts 324 is provided with the sliding surface 325 bulging radially outward and for sliding on the cylinder inner circumferential surface 91. The sliding surface 325 of the first slide part 324A on the combustion chamber S1 side between the two slide parts 324 has the first curved surface 26 on the combustion chamber S1 side with respect to the tip portion P where the diameter of the first slide part 324A becomes the largest, and the second curved surface 27 on the crank chamber S2 side with respect to the tip portion P. When the sliding surface 325 is cut by the plane perpendicular to the circumferential directions, the first and second curved surfaces 26 and 27 are connected with each other at the tip portion P while the tangent lines t1 and t2 thereof in the cross section align with each other. In the cross sections of the first and second curved surfaces 26 and 27, when the positional change rate to the radially inward side with respect to the distance from the tip portion P in the axial direction is compared between a point on the first curved surface 26 and a point on the second curved surface 27 taken at the same distance from the tip portion P in the axial direction, the positional change rate of the first curved surface 26 is lower than that of the second curved surface 27.

By this configuration, the suitable oil film can be formed and also the scraped up amount of oil can be reduced when the piston 80 elevates, and the oil can effectively be scraped off when the piston 80 descends. As a result, the sliding resistance of the piston 80 can be reduced, and the oil consumption can be reduced.

OTHER EMBODIMENTS

The above embodiments are described as instantiations of the present invention. However, the present invention is not limited to these embodiments, and it can be applied to various embodiments with suitable changes, replacements, additions, omissions, etc. Moreover, another embodiment can be obtained by combining any of the components described in the above embodiments. Furthermore, not all the components illustrated in the appended drawings and/or described in the above embodiments are essential in terms of achieving the main aim of the present invention, and components which are unessential in terms of achieving the main aim of the present invention may be included, for illustrating the present invention. Therefore, those unessential components should not instantly be recognized as essential only because they are illustrated in the appended drawings and/or described in the above embodiment.

The following configuration may be adopted to any of the above embodiments.

The configuration of the oil ring is merely an illustration, and the cross sections of the sliding surfaces 25 and 325 may not have the arc shape. For example, the cross section of each of the sliding surfaces 25 and 325 may have a curved shape of which the curve is expressed by a quadratic curve or an exponent function. Further, the cross section of each of the sliding surfaces 25 and 325 may have a curved shape of which the curvature radius changes as they extend away from the tip portion P in the axial direction.

Although the outer circumferential surface 23 includes the first connection surface 23a, the sliding surface 25, and the second connection surface 23b, the first and second connection surfaces 23a and 23b may be omitted. In this case, the first curved surface 26 is connected with the side surface 21 and the second curved surface 27 is connected with the side surface 22.

Further, the configurations of the spacer expander 30 and the coil expander 330 are not limited to the above embodiments. Any expander may be adopted as long as the side rail 20 and the ring body 320 can be biased radially outward.

Moreover, in the oil ring 300 of the third embodiment illustrated in FIG. 11, the second slide part 324B is provided with the first curved surface 26 on the crank chamber S2 side and the second curved surface 27 on the combustion chamber S1 side; however, alternatively, the second slide part 324B may be provided with the first curved surface 26 on the combustion chamber S1 side and the second curved surface 27 on the crank chamber S2 side similar to the slide part 324A.

EXAMPLES

Next, changes in oil film thickness and sliding resistance when the curvature radius of the first curved surface 26 is changed are described.

Figure 12:
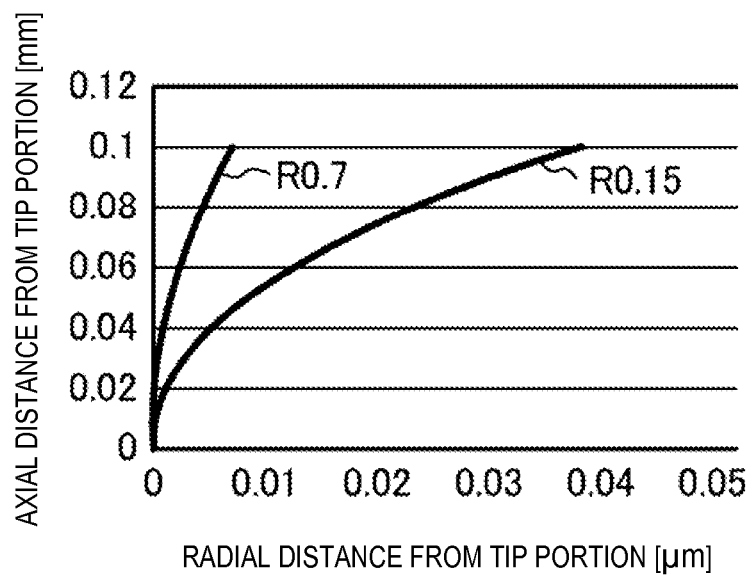
FIG. 12 is a chart illustrating cross-sectional shapes of a first curved surface.
Figure 13:
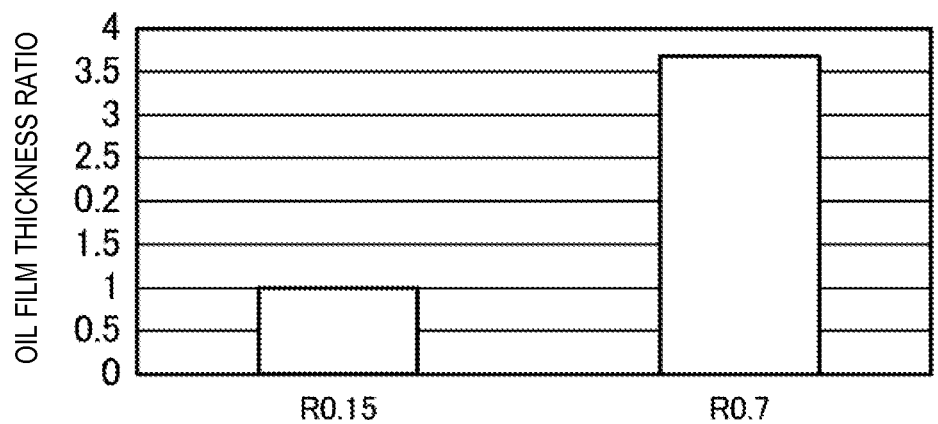
FIG. 13 shows a calculation result of thicknesses of an oil film.
Figure 14:
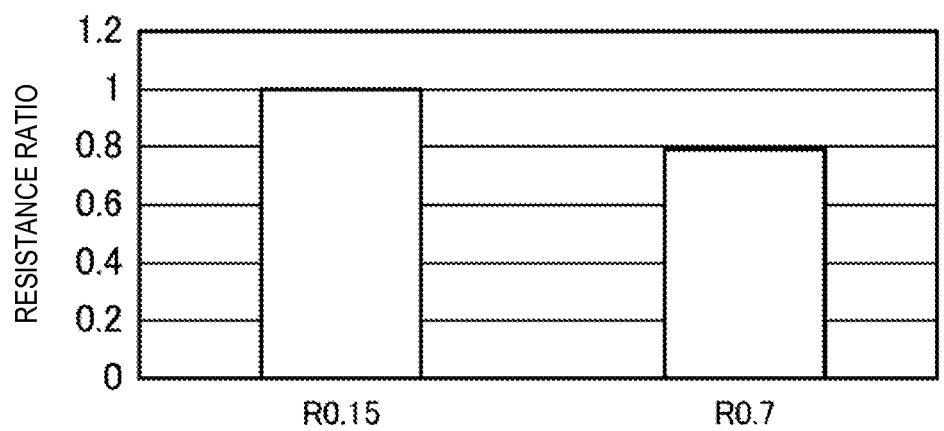
FIG. 14 shows a calculation result of resistance.

Under a condition that the axial dimension h1 of the first curved surface 26 is 0.1 mm and a ring surface pressure is 0.4 MPa, the oil film thickness formed by using engine oil with 0 W-20 viscosity (90° C.) when the piston 80 is elevated at 33 m/s is calculated by the Reynolds equation, while changing the curvature radius of the first curved surface 26. Here, the curvature radius is 0.15 mm and 0.7 mm. FIG. 12 is a chart illustrating cross-sectional shapes of the first curved surface 26. FIG. 13 shows a calculation result of thicknesses of the oil film. FIG. 14 shows a calculation result of resistance. In FIG. 13, the oil film thickness is 1 when the curvature radius is 0.15 mm, and in FIG. 14, the resistance is 1 when the curvature radius is 0.15 mm.

As can be understood from FIGS. 13 and 14, when the curvature radius is changed from 0.15 mm to 0.7 mm, the oil film thickness increases by approximately 3.0 times, and the resistance decreases to approximately 0.8 times. Note that when the curvature radius is 0.15 mm, the oil film thickness is approximately 0.50 μm and the resistance is 17 N/m.

Thus, it can be understood that the oil film thickness increases and the resistance decreases by increasing the curvature radius.

Figure 15:
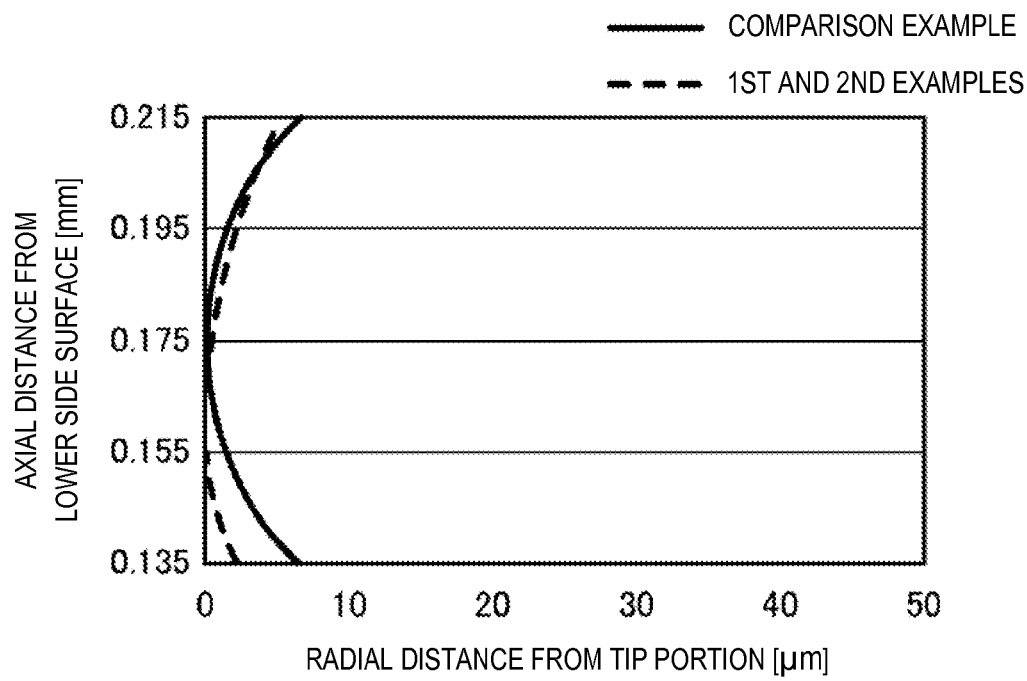
FIG. 15 is a chart illustrating cross-sectional shapes of sliding surfaces of three kinds of side rails used for measurement.
Figure 16:
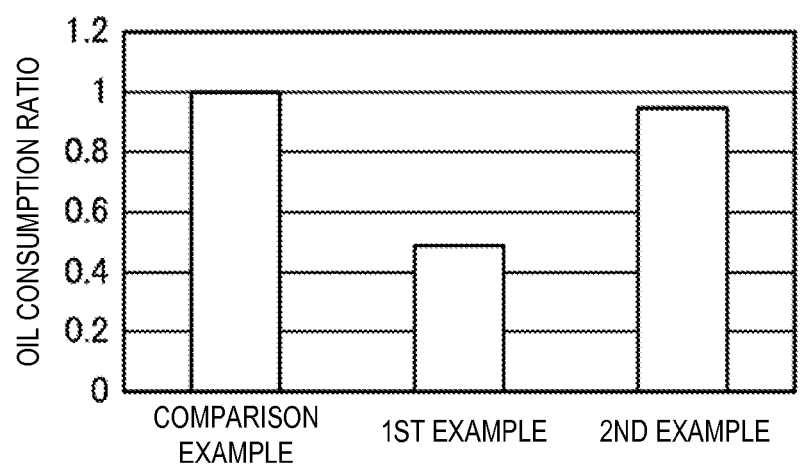
FIG. 16 shows a measurement result of oil consumption.

Next, a result of actually measuring the oil consumption in an engine by using a plurality of side rails 20 is described. FIG. 15 is a chart illustrating cross-sectional shapes of the sliding surfaces 25 of three kinds of side rails 20 used for the measurement. FIG. 16 shows a measurement result of the oil consumption.

The engine is a four-stroke water-cooled gasoline engine of a natural aspiration type, having a bore diameter of 89 mm and a stroke length of 100 mm. The oil consumption is measured when the engine is operated at a speed of 6,000 rpm under full load.

Each of the three kinds of side rails has an axial dimension (i.e., thickness) of 0.35 mm.

In a side rail of a comparison example, the sliding surface 25 has a symmetric shape in the axial direction. Specifically, the tip portion P is at a position away from the lower side surface 22 by 0.175 mm in the axial direction, and the curvature radii of the first and second curved surfaces 26 and 27 are both 0.125 mm. In side rails in first and second examples, the sliding surface 25 has an asymmetric shape in the axial direction. Specifically, the tip portion P is at a position away from the lower side surface 22 by 0.15 mm in the axial direction. The curvature radius of the first curved surface 26 is 0.31 mm, and the curvature radius of the second curved surface 27 is 0.09 mm.

The side rails of the comparison example and the first example are configured to have a tension of 18.5 N when contained inside the ring groove 82 along with the spacer expander 30. The side rail of the second example is configured to have a tension of 9.5 N when contained inside the ring groove 82 along with the spacer expander 30.

In a case where the engine is operated for the same period of time under the operating condition described above by using the side rails, respectively, the oil consumption in the first example with respect to the oil consumption in the comparison example is approximately 0.5 times thereof, which indicates that the oil consumption is significantly reduced.

Further, when the comparison example is compared to the second example, the oil consumption of the side rail of the second example is slightly lower, approximately 0.95 times the oil consumption of the side rail of the comparison example. However, the side rail of the second example has substantially half of the tension of the side rail of the comparison example. In other words, it can be understood from this result that by changing the shape of the sliding surface from the shape of the comparison example to the shape of the second example, the sliding resistance can be reduced without increasing the oil consumption.

As described above, the present invention is useful for oil rings.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

100 Oil Ring
20A First Side Rail (Ring Body)
20B Second Side Rail (Ring Body)
23 Outer Circumferential Surface
25 Sliding Surface
26 First Curved Surface
27 Second Curved Surface
30 Spacer Expander
200 Oil Ring
300 Oil Ring
320 Ring Body
324A First Slide Part
324B Second Slide Part
325 Sliding Surface
330 Coil Expander
80 Piston
82 Ring Groove
91 Cylinder Inner Circumferential Surface
S1 Combustion Chamber
S2 Crank Chamber
t1 Tangent Line
t2 Tangent Line

What is claimed is:

1. An oil ring to be attached to a ring groove of a piston for an engine, comprising:
   two annular ring bodies having a common axis and arranged in tandem; and
   an expander for biasing the ring bodies radially outward,
   wherein a sliding surface is formed at an outer circumference of each of the ring bodies to bulge radially outward and slide on an inner circumferential surface of a cylinder,
   wherein the sliding surface of at least one of the ring bodies located on a combustion chamber side of the engine has:
      a tip portion where the ring body has a largest diameter;
      a first curved surface provided proximate the tip portion in an axial direction of the ring body on the combustion chamber side with respect to the tip portion; and
      a second curved surface provided proximate the tip portion in the axial direction of the ring body on an opposite side from the combustion chamber with respect to the tip portion,
   wherein in cross sections of the first and second curved surfaces taken along a plane perpendicular to a circumferential direction of the ring body, the first and second curved surfaces are connected with each other while tangent lines to the cross sections at the tip portion align with each other,
   wherein in the cross sections of the first and second curved surfaces, when a positional change rate of a point on the first curved surface is compared with a positional change rate of a point on the second curved surface, the change rate of the first curved surface is lower than the change rate of the second curved surface, the positional change rate indicating the positional change to the radially inward side with respect to a distance from the tip portion in the axial direction of the ring body, the point on the first curved surface and the point on the second curved surface being taken at a same distance from the tip portion in the axial direction,
   wherein a first curvature radius of the first curved surface is a first distance from a first intersection point to the first curved surface, the first intersection point being an intersection between a first predetermined straight line extending in a radial direction along the radius of the oil ring to the tip portion, and a second predetermined straight line that is perpendicular to a tangential line that is tangential to the first curved surface, wherein a second curvature radius of the second curved surface is a second distance from a second intersection point to the second curved surface, the second intersection point being an intersection between the first predetermined straight line and a third predetermined straight line that is perpendicular to a tangential line that is tangential to the second curved surface, wherein a ratio of the first curvature radius to the second curvature radius is between 7/5 and 5, and wherein the first intersection point is the center of curvature of the first curved surface, and the second intersection point is the center of curvature of the second curved surface.

2. The oil ring of claim 1, wherein when the ring body is inclined the most within the ring groove while the piston moves to the combustion chamber side, an end part of the first curved surface forms a wedge-shaped gap with the inner circumferential surface of the cylinder without contacting with the inner circumferential surface of the cylinder, the end part being on the opposite side from the tip portion.

3. The oil ring of claim 1, wherein the cross sections of the first and second curved surfaces have an arc shape, and wherein the first curvature radius of the first curved surface is larger than the second curvature radius of the second curved surface.

4. The oil ring of claim 3, wherein the tip portion is offset from a central portion of the sliding surface in the axial direction, to the opposite side from the combustion chamber.

5. The oil ring of claim 3, wherein the first curvature radius of the first curved surface is smaller than a radial dimension taken from an inner circumferential edge of the ring body to the tip portion.

6. The oil ring of claim 3, wherein the second curvature radius of the second curved surface is between 0.09 mm and 0.5 mm.

7. The oil ring of claim 1, wherein the sliding surface of one of the ring bodies on the opposite side from the combustion chamber has the first and second curved surfaces.

8. An oil ring to be attached to a ring groove of a piston for an engine, comprising:

an annular ring body; and an expander for biasing the ring body radially outward, wherein two annular slide parts having a common axis and arranged in tandem are provided at an outer circumference of the ring body, wherein a sliding surface is formed at each of the slide parts to bulge radially outward and slide on an inner circumferential surface of a cylinder, wherein the sliding surface of at least one of the slide parts located on a combustion chamber side of the engine has:

a tip portion where the slide part has a largest diameter;

a first curved surface provided proximate the tip portion in an axial direction of the ring body on the combustion chamber side with respect to the tip portion; and a second curved surface provided proximate the tip portion in the axial direction of the ring body on an opposite side from the combustion chamber with respect to the tip portion, wherein in cross sections of the first and second curved surfaces taken along a plane perpendicular to a circumferential direction of the slide part, the first and second curved surfaces are connected with each other while tangent lines to the cross sections at the tip portion align with each other, wherein in the cross sections of the first and second curved surfaces, when a positional change rate of a point on the first curved surface is compared with a positional change rate of a point on the second curved surface, the change rate of the first curved surface is lower than the change rate of the second curved surface, the positional change rate indicating the positional change to the radially inward side with respect to a distance from the tip portion in the axial direction of the slide part, the point on the first curved surface and the point on the second curved surface being taken at a same distance from the tip portion in the axial direction, wherein a first curvature radius of the first curved surface is a first distance from a first intersection point to the first curved surface, the first intersection point being an intersection between a first predetermined straight line extending in a radial direction along the radius of the oil ring to the tip portion, and a second predetermined straight line that is perpendicular to a tangential line that is tangential to the first curved surface, wherein a second curvature radius of the second curved surface is a second distance from a second intersection point to the second curved surface, the second intersection point being an intersection between the first predetermined straight line and a third predetermined straight line that is perpendicular to a tangential line that is tangential to the second curved surface, wherein a ratio of the first curvature radius to the second curvature radius is between 7/5 and 5, and wherein the first intersection point is the center of curvature of the first curved surface, and the second intersection point is the center of curvature of the second curved surface.

9. The oil ring of claim 8, wherein when the ring body is inclined the most within the ring groove while the piston moves to the combustion chamber side, an end part of the first curved surface forms a wedge-shaped gap with the inner circumferential surface of the cylinder without contacting with the inner circumferential surface of the cylinder, the end part being on the opposite side from the tip portion.

10. The oil ring of claim 8, wherein the cross sections of the first and second curved surfaces have an arc shape, and wherein the first curvature radius of the first curved surface is larger than the second curvature radius of the second curved surface.

11. The oil ring of claim 10, wherein the tip portion is offset from a central portion of the sliding surface in the axial direction, to the opposite side from the combustion chamber.

12. The oil ring of claim 10, wherein the first curvature radius of the first curved surface is smaller than a radial dimension taken from an inner circumferential edge of the ring body to the tip portion.

13. The oil ring of claim 10, wherein the second curvature radius of the second curved surface is between 0.09 mm and 0.5 mm.

14. The oil ring of claim 1, wherein the first curvature radius of the first curved surface is between 0.21 mm and 0.45 mm.

15. The oil ring of claim 1, wherein the ratio of the first curvature radius of the first curved surface to the second curvature radius of the second curved surface is between 7/3 and 3.

16. The oil ring of claim 8, wherein the first curvature radius of the first curved surface is between 0.21 mm and 0.45 mm.

17. The oil ring of claim 8, wherein the ratio of the first curvature radius of the first curved surface to the second curvature radius of the second curved surface is between 7/3 and 3.

18. An oil ring to be attached to a ring groove of a piston for an engine, comprising:
two annular ring bodies having a common axis and arranged in tandem; and
an expander for biasing the ring bodies radially outward,
wherein a sliding surface is formed at an outer circumference of each of the ring bodies to bulge radially outward and slide on an inner circumferential surface of a cylinder,
wherein the sliding surface of at least one of the ring bodies located on a combustion chamber side of the engine has:
a tip portion where the ring body has a largest diameter;
a first curved surface provided proximate the tip portion in an axial direction of the ring body on the combustion chamber side with respect to the tip portion; and
a second curved surface provided proximate the tip portion in the axial direction of the ring body on an opposite side from the combustion chamber with respect to the tip portion,
wherein in cross sections of the first and second curved surfaces taken along a plane perpendicular to a circumferential direction of the ring body, the first and second curved surfaces are connected with each other while tangent lines to the cross sections at the tip portion align with each other,
wherein in the cross sections of the first and second curved surfaces, when a positional change rate of a point on the first curved surface is compared with a positional change rate of a point on the second curved surface, the change rate of the first curved surface is lower than the change rate of the second curved surface, the positional change rate indicating the positional change to the radially inward side with respect to a distance from the tip portion in the axial direction of the ring body, the point on the first curved surface and the point on the second curved surface being taken at a same distance from the tip portion in the axial direction,
wherein inner circumferential surfaces of the annular ring bodies are structurally supported by an ear portion provided on an inner circumferential edge portion of the expander,
wherein a clearance is provided between a side surface of the expander and a side surface of the annular ring bodies facing the side surface of the expander in the axial direction,
wherein a first curvature radius of the first curved surface is a first distance from a first intersection point to the first curved surface, the first intersection point being an intersection between a first predetermined straight line extending in a radial direction along the radius of the oil ring to the tip portion, and a second predetermined straight line that is perpendicular to a tangential line that is tangential to the first curved surface,
wherein a second curvature radius of the second curved surface is a second distance from a second intersection point to the second curved surface, the second intersection point being an intersection between the first predetermined straight line and a third predetermined straight line that is perpendicular to a tangential line that is tangential to the second curved surface,
wherein a ratio of the first curvature radius to the second curvature radius is between 7/5 and 5, and
wherein the first intersection point is the center of curvature of the first curved surface, and the second intersection point is the center of curvature of the second curved surface.

19. An oil ring to be attached to a ring groove of a piston for an engine, comprising:
two annular ring bodies having a common axis and arranged in tandem; and
an expander for biasing the ring bodies radially outward,
wherein a sliding surface is formed at an outer circumference of each of the ring bodies to bulge radially outward and slide on an inner circumferential surface of a cylinder,
wherein the sliding surface of at least one of the ring bodies located on a combustion chamber side of the engine has:
a tip portion where the ring body has a largest diameter;
a first curved surface provided proximate the tip portion in an axial direction of the ring body on the combustion chamber side with respect to the tip portion; and
a second curved surface provided proximate the tip portion in the axial direction of the ring body on an opposite side from the combustion chamber with respect to the tip portion,
wherein in cross sections of the first and second curved surfaces taken along a plane perpendicular to a circumferential direction of the ring body, the first and second curved surfaces are connected with each other while tangent lines to the cross sections at the tip portion align with each other,
wherein in the cross sections of the first and second curved surfaces, when a positional change rate of a point on the first curved surface is compared with a positional change rate of a point on the second curved surface, the change rate of the first curved surface is lower than the change rate of the second curved surface, the positional change rate indicating the positional change to the radially inward side with respect to a distance from the tip portion in the axial direction of the ring body, the point on the first curved surface and the point on the second curved surface being taken at a same distance from the tip portion in the axial direction,
wherein a first curvature radius of the first curved surface is a first distance from a first intersection point to the first curved surface, the first intersection point being an intersection between a first predetermined straight line extending in a radial direction along the radius of the oil ring to the tip portion, and a second predetermined straight line that is perpendicular to a tangential line that is tangential to the first curved surface,
wherein a second curvature radius of the second curved surface is a second distance from a second intersection point to the second curved surface, the second intersection point being an intersection between the first predetermined straight line and a third predetermined straight line that is perpendicular to a tangential line that is tangential to the second curved surface,
wherein a ratio of the first curvature radius to the second curvature radius is between 7/5 and 5,
wherein the first intersection point is the center of curvature of the first curved surface, and the second intersection point is the center of curvature of the second curved surface, wherein the expander is configured with an ear portion abutting an inner circumferential surface of the ring body, wherein the expander is further configured with an abutting side surface, provided facing an inner side wall of the ring groove, the abutting side surface of the expander abutting a side surface of the ring body in the axial direction of the ring body, and wherein the expander is further configured with a non-abutting side surface adjacent to the abutting side surface, the non-abutting side surface provided facing the inner side wall of the ring groove, a clearance being provided between the non-abutting side surface and the side surface of the ring body in the axial direction of the ring body, such that the non-abutting side surface does not contact the side surface of the ring body.

20. An oil ring to be attached to a ring groove of a piston for an engine, comprising:

an annular ring body; and an expander for biasing the ring body radially outward, wherein two annular slide parts having a common axis and arranged in tandem are provided at an outer circumference of the ring body, wherein a sliding surface is formed at each of the slide parts to bulge radially outward and slide on an inner circumferential surface of a cylinder, wherein the sliding surface of at least one of the slide parts located on a combustion chamber side of the engine has:

a tip portion where the slide part has a largest diameter;

a first curved surface provided proximate the tip portion in an axial direction of the ring body on the combustion chamber side with respect to the tip portion; and a second curved surface provided proximate the tip portion in the axial direction of the ring body on an opposite side from the combustion chamber with respect to the tip portion, wherein in cross sections of the first and second curved surfaces taken along a plane perpendicular to a circumferential direction of the slide part, the first and second curved surfaces are connected with each other while tangent lines to the cross sections at the tip portion align with each other, wherein in the cross sections of the first and second curved surfaces, when a positional change rate of a point on the first curved surface is compared with a positional change rate of a point on the second curved surface, the change rate of the first curved surface is lower than the change rate of the second curved surface, the positional change rate indicating the positional change to the radially inward side with respect to a distance from the tip portion in the axial direction of the slide part, the point on the first curved surface and the point on the second curved surface being taken at a same distance from the tip portion in the axial direction, wherein a first curvature radius of the first curved surface is a first distance from a first intersection point to the first curved surface, the first intersection point being an intersection between a first predetermined straight line extending in a radial direction along the radius of the oil ring to the tip portion, and a second predetermined straight line that is perpendicular to a tangential line that is tangential to the first curved surface, wherein a second curvature radius of the second curved surface is a second distance from a second intersection point to the second curved surface, the second intersection point being an intersection between the first predetermined straight line and a third predetermined straight line that is perpendicular to a tangential line that is tangential to the second curved surface, wherein a ratio of the first curvature radius to the second curvature radius is between 7/5 and 5, wherein the first intersection point is the center of curvature of the first curved surface, and the second intersection point is the center of curvature of the second curved surface, wherein the ring body further comprises a first slide part protruding toward the inner circumferential surface of the cylinder toward the combustion chamber side, a second slide part protruding toward the inner circumferential surface of the cylinder toward the opposite side from the combustion chamber, and a web penetrated by holes formed in radial directions of the ring body, wherein the first slide part is operatively coupled to the second slide part;

wherein the expander is provided on an inner side of the web in the radial direction of the ring body, wherein the first slide part is provided with the first curved surface, and wherein the second slide part is provided with the second curved surface.

* * * * *